US012626916B2

(12) United States Patent
Zhang et al.

(10) Patent No.: US 12,626,916 B2
(45) Date of Patent: May 12, 2026

(54) ALUMINUM-COATED PRECURSOR, PREPARATION METHOD THEREFOR, AND USE THEREOF

(71) Applicant: SVolt Energy Technology Company Limited, Changzhou (CN)

(72) Inventors: Yongjie Zhang, Changzhou (CN); Jiangtao Wan, Changzhou (CN); Haipeng Ren, Changzhou (CN); Ning Zhang, Changzhou (CN); Jinxin Zhu, Changzhou (CN)

(73) Assignee: SVolt Energy Technology Co., Ltd., Changzhou (CN)

( * ) Notice: Subject to any disclaimer, the term of this patent is extended or adjusted under 35 U.S.C. 154(b) by 907 days.

(21) Appl. No.: 17/789,043

(22) PCT Filed: Oct. 29, 2020

(86) PCT No.: PCT/CN2020/124789
§ 371 (c)(1),
(2) Date: Jun. 24, 2022

(87) PCT Pub. No.: WO2021/129130
PCT Pub. Date: Jul. 1, 2021

(65) Prior Publication Data
US 2023/0033278 A1 Feb. 2, 2023

(30) Foreign Application Priority Data
Dec. 27, 2019 (CN) .......................... 201911377185.7

(51) Int. Cl.
H01M 4/525 (2010.01)
C01G 53/50 (2025.01)
(Continued)

(52) U.S. Cl.
CPC ............ *H01M 4/525* (2013.01); *C01G 53/50* (2013.01); *H01M 4/505* (2013.01);
(Continued)

(58) Field of Classification Search
CPC ...................................................... C01G 53/40
See application file for complete search history.

(56) References Cited

U.S. PATENT DOCUMENTS

2013/0040201 A1 2/2013 Manthiram et al.

FOREIGN PATENT DOCUMENTS

CN 1735986 A * 2/2006
CN 103 956 479 B 4/2016
(Continued)

OTHER PUBLICATIONS

Hiroshi, English machine translation of CN1735986A. (Year: 2006).*
(Continued)

*Primary Examiner* — Peter F Godenschwager
(74) *Attorney, Agent, or Firm* — Wolf, Greenfield & Sacks, P.C.

(57) ABSTRACT

Disclosed are an aluminum-coated precursor and a preparation method therefor. The aluminum coated precursor has a chemical formula of $xMCO_3(1-x)\cdot Al(OH)_3$, wherein M is at least one of nickel, cobalt and manganese, and x is 0.995-0.999. The aluminum-coated precursor has the advantages of a controllable particle size and uniform particle size distribution, a high degree of sphericity, a smooth particle surface, a high tap density, not easily breaking, and an excellent electrochemical performance and energy density.

12 Claims, 3 Drawing Sheets

(51) Int. Cl.
   H01M 4/02 (2006.01)
   H01M 4/505 (2010.01)

(52) U.S. Cl.
   CPC ...... *C01P 2002/54* (2013.01); *C01P 2004/61* (2013.01); *C01P 2004/84* (2013.01); *C01P 2006/11* (2013.01); *C01P 2006/40* (2013.01); *H01M 2004/021* (2013.01); *H01M 2004/028* (2013.01); *H01M 2220/20* (2013.01)

(56) References Cited

FOREIGN PATENT DOCUMENTS

| | | |
|---|---|---|
| CN | 103 560 236 B | 5/2016 |
| CN | 103 618 064 B | 5/2016 |
| CN | 108 448 076 A | 8/2018 |
| KR | 10-2016-0066227 A | 6/2016 |
| WO | WO 2012/022618 A1 | 2/2012 |

OTHER PUBLICATIONS

Extended European Search Report dated Sep. 27, 2023, in connection with European Application No. 20907658.7.

European Communication pursuant to Article 94(3) EPC, dated Aug. 7, 2025, in connection with European Application No. 20907658.7.

* cited by examiner

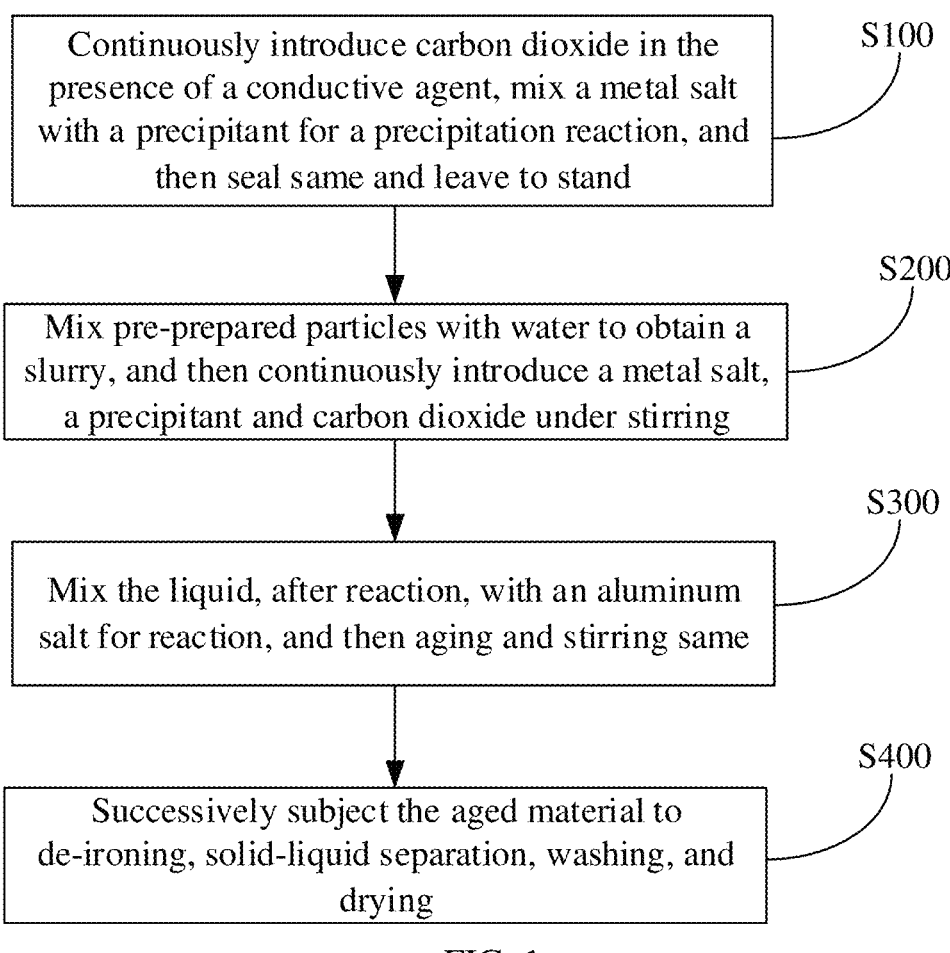

Continuously introduce carbon dioxide in the presence of a conductive agent, mix a metal salt with a precipitant for a precipitation reaction, and then seal same and leave to stand — S100

Mix pre-prepared particles with water to obtain a slurry, and then continuously introduce a metal salt, a precipitant and carbon dioxide under stirring — S200

Mix the liquid, after reaction, with an aluminum salt for reaction, and then aging and stirring same — S300

Successively subject the aged material to de-ironing, solid-liquid separation, washing, and drying — S400

FIG. 1

Mix a precursor with a lithium salt and perform primary sintering, so as to obtain a primary sintered material — Sa Crush the primary sintered material and perform secondary sintering, so as to obtain a cathode material — Sb

FIG. 2

ALUMINUM-COATED PRECURSOR, PREPARATION METHOD THEREFOR, AND USE THEREOF

CROSS-REFERENCE TO RELATED APPLICATIONS

This Application is a national stage filing under 35 U.S.C. § 371 of International Patent Application Serial No. PCT/CN2020/124789, filed Oct. 29, 2020, which claims priority to Chinese application number 201911377185.7 filed on Dec. 27, 2019. The entire contents of these applications are incorporated herein by reference in their entirety.

TECHNICAL FIELD

The present disclosure relates to the field of lithium batteries, for example, to an aluminum-coated precursor, a preparation method therefor, and use thereof.

BACKGROUND

Lithium-ion batteries play an important role in daily life. The development of the new energy automobile industry puts forward new requirements for lithium-ion batteries, and the improvement of the energy density of lithium-ion batteries is in urgent need. Lithium-rich manganese-based cathode materials have advantages of high specific capacity of 250 mAh/g to 350 mAh/g, low price, and environmental friendliness and thus have a high research value. The existing preparation of lithium-rich manganese-based cathode materials is generally divided into two steps, the first step is the preparation of a lithium-rich precursor, and the second step is the sintering of the precursor. The physical characteristics of lithium-rich manganese-based materials, such as morphology, particle size distribution and tap density, depend on the precursor to a great extent. However, the existing lithium-rich manganese-based precursors in the market have various defects, such as small particle size, low tap density ($\leq 1.5$ g/cm$^3$) and poor degree of sphericity.

Therefore, the existing lithium-rich manganese-based precursors need to be improved.

SUMMARY

The present disclosure provides an aluminum-coated precursor, a preparation method therefor, and use thereof.

The present disclosure provides an aluminum-coated precursor in an embodiment. The precursor has a chemical formula of $xMCO_3(1-x) \cdot Al(OH)_3$, where M is at least one of nickel, cobalt and manganese, and x is 0.995 to 0.999, for example, 0.995, 0.996, 0.997, 0.998, 0.999, etc.

In an embodiment provided by the present disclosure, the aluminum-coated precursor has the advantages of controllable particle size, uniform particle size distribution, high degree of sphericity, smooth particle surface, high tap density, not easily breaking, excellent electrochemical performance, and excellent energy density, and meanwhile, the cathode material prepared by using the precursor has a high specific capacity, excellent cycle performance, and excellent electrochemical discharge performance.

In an embodiment, the precursor has a particle size of 6 μm to 15 μm, for example, 6 μm, 7 μm, 8 μm, 9 μm, 10 μm, 11 μm, 12 μm, 13 μm, 14 μm or 15 μm, etc., and the precursor has a tap density of not lower than 1.8 g/cm$^3$, for example, 1.81 g/cm$^3$, 1.82 g/cm$^3$, 1.83 g/cm$^3$, 1.84 g/cm$^3$, 1.85 g/cm$^3$, 1.86 g/cm$^3$, 1.87 g/cm$^3$, 1.88 g/cm$^3$, 1.89 g/cm$^3$ or 1.9 g/cm$^3$, etc.

The present disclosure provides a method for preparing the precursor in an embodiment. The method includes:

(1) continuously introducing carbon dioxide in the presence of a conductive agent, mixing a metal salt with a precipitant for a precipitation reaction, and then sealing the same and leaving to stand, so as to obtain pre-prepared particles;

(2) mixing the pre-prepared particles with water to obtain a slurry, and with stirring, continuously introducing the metal salt, the precipitant and carbon dioxide for a coprecipitation reaction, so as to obtain a reacted liquid;

(3) mixing the reacted liquid with an aluminum salt for a reaction, and aging and stirring the same, so as to obtain an aged material; and (4) successively performing iron removal, solid-liquid separation, washing, and drying on the aged material, so as to obtain an aluminum-coated precursor.

In an embodiment provided by the present disclosure, first, carbon dioxide is continuously introduced in the presence of a conductive agent, and then a metal salt and a precipitant are added. In the above step, the continuous introduction of carbon dioxide can adjust the pH of the system, maintain the inert environment of the system, prevent metal elements from being oxidized during coprecipitation and improve the degree of sphericity of the precursor, and the conductive agent can improve the rate capability of the material. Then, the metal salt, the precipitant, carbon dioxide and a complexing agent are continuously introduced into the slurry obtained by mixing the pre-prepared particles with water. In the above step, the complexing agent can reduce the reaction speed of the system and inhibit the formation of new particles in the system, the metal salt and the precipitant are subjected to the coprecipitation reaction in this process with the pre-prepared particles of small particle size as seed crystals, and meanwhile, the precipitant and carbon dioxide are continuously introduced in this process to continue to maintain the pH stability of the system, thereby obtaining a dense precursor. Then, the obtained reacted liquid including the precursor is mixed with the aluminum salt for aging and stirring. In the above step, under the action of the precipitant, aluminum elements form precipitates that uniformly adhere to the surface of the precursor. Finally, after the successive processes of iron removal, solid-liquid separation, washing, and drying, the aluminum-coated precursor with controllable particle size, uniform particle size distribution, high degree of sphericity, smooth particle surface, high tap density, not easily breaking, excellent electrochemical performance, and excellent energy density can be prepared, and meanwhile, the cathode material prepared by using the precursor has a high specific capacity, excellent cycle performance, and excellent electrochemical discharge performance.

In step (1) provided by an embodiment of the present disclosure, a metal salt and a precipitant are quickly mixed (within 10 seconds) in the presence of a conductive agent and then sealed and left to stand, so as to obtain pre-prepared particles. In this process, the continuous introduction of carbon dioxide can adjust the pH of the system, maintain the inert environment of the system, prevent metal elements from being oxidized during coprecipitation and improve the degree of sphericity of the precursor, and the conductive agent can improve the rate capability of the material.

In step (2) provided by an embodiment of the present disclosure, the metal salt and the precipitant are subjected to the coprecipitation reaction in this process with the pre-prepared particles of small particle size as seed crystals, and meanwhile, carbon dioxide is continuously introduced in this process to continue to maintain the pH stability of the system, thereby obtaining a dense precursor.

In step (3) provided by an embodiment of the present disclosure, the obtained reacted liquid is mixed with the aluminum salt for a reaction and then is aged and stirred. In this process, aluminum elements in the aluminum salt react with the precipitant to precipitate on the surface of the precursor, so as to obtain the aged material, and with the coating of the aluminum elements, the precursor is more stable.

In step (4) provided by an embodiment of the present disclosure, the aged material is successively subjected to iron removal, solid-liquid separation, washing, and drying, so as to obtain an aluminum-coated precursor. It is to be noted that iron removal, solid-liquid separation, washing, and drying in this step are the conventional operation in the precursor preparation process, which can be selected by those skilled in the art according to actual requirements, and details will not be repeated herein.

In an embodiment, in step (1), the metal salt includes at least one of a soluble nickel salt, a soluble manganese salt, and a soluble cobalt salt.

In an embodiment, in step (1), the metal salt is in a concentration of 80 g/L to 400 g/L, for example, 80 g/L, 100 g/L, 150 g/L, 200 g/L, 250 g/L, 300 g/L, 350 g/L or 400 g/L, etc.

In an embodiment, in step (1), the soluble nickel salt is at least one selected from the group consisting of nickel chloride, nickel nitrate, and nickel sulfate.

In an embodiment, in step (1), the soluble cobalt salt is at least one selected from the group consisting of cobalt chloride, cobalt nitrate, and cobalt sulfate.

In an embodiment, in step (1), the soluble manganese salt is at least one selected from the group consisting of manganese chloride, manganese nitrate, and manganese sulfate.

In an embodiment, in step (1), the carbon dioxide is at a flow rate of 0.1 L/min to 0.5 L/min, for example, 0.1 L/min, 0.15 L/min, 0.2 L/min, 0.25 L/min, 0.3 L/min, 0.35 L/min, 0.4 L/min, 0.45 L/min or 0.5 L/min, etc.

In an embodiment provided by the present disclosure, the flow rate of carbon dioxide is 0.1 L/min to 0.5 L/min. If the flow rate of carbon dioxide is too high, the instability of the system is increased and the gas is wasted, while the carbon dioxide in the flow rate range of the present application can effectively maintain the inert environment of the system and satisfy the reaction requirements.

In an embodiment, in step (1), the metal salt and the precipitant are in a molar ratio of 1:(2 to 3.5), for example, 1:2, 1:2.1, 1:2.2, 1:2.3, 1:2.4, 1:2.5, 1:2.6, 1:2.7, 1:2.8, 1:2.9, 1:3.0, 1:3.1, 1:3.2, 1:3.3, 1:3.4 or 1:3.5, etc.

In an embodiment provided by the present disclosure, the molar ratio of the metal salt and the precipitant is 1:(2 to 3.5). If the ratio of the precipitant is too high, the system easily generates new crystal nuclei and the pH of the system easily fluctuates.

In an embodiment, in step (1), the conductive agent is used in an amount of 10 g to 50 g, based on a total of 1 L of the metal salt and the precipitant, for example, 10 g, 15 g, 20 g, 25 g, 30 g, 35 g, 40 g, 45 g or 50 g, etc. If the concentration of the conductive agent is too high, the specific capacity of the material is reduced.

In an embodiment, in step (1), the precipitant is at least one selected from the group consisting of sodium carbonate, ammonium bicarbonate, sodium hydroxide, and sodium bicarbonate.

In an embodiment, in step (1), the sodium carbonate is in a concentration of 50 g/L to 200 g/L, for example, 50 g/L, 60 g/L, 70 g/L, 80 g/L, 90 g/L, 100 g/L, 110 g/L, 120 g/L, 130 g/L, 140 g/L, 150 g/L, 160 g/L, 170 g/L, 180 g/L, 190 g/L or 200 g/L, etc.

In an embodiment, in step (1), the ammonium bicarbonate is in a concentration of 50 g/L to 200 g/L, for example, 50 g/L, 60 g/L, 70 g/L, 80 g/L, 90 g/L, 100 g/L, 110 g/L, 120 g/L, 130 g/L, 140 g/L, 150 g/L, 160 g/L, 170 g/L, 180 g/L, 190 g/L or 200 g/L, etc.

In an embodiment, in step (1), the sodium hydroxide is in a concentration of 50 g/L to 200 g/L, for example, 50 g/L, 60 g/L, 70 g/L, 80 g/L, 90 g/L, 100 g/L, 110 g/L, 120 g/L, 130 g/L, 140 g/L, 150 g/L, 160 g/L, 170 g/L, 180 g/L, 190 g/L or 200 g/L, etc.

In an embodiment, in step (1), the sodium bicarbonate is in a concentration of 50 g/L to 200 g/L, for example, 50 g/L, 60 g/L, 70 g/L, 80 g/L, 90 g/L, 100 g/L, 110 g/L, 120 g/L, 130 g/L, 140 g/L, 150 g/L, 160 g/L, 170 g/L, 180 g/L, 190 g/L or 200 g/L, etc.

In an embodiment, in step (1), the precipitation reaction is performed at a temperature of 30° C. to 80° C., for example, 30° C., 35° C., 40° C., 45° C., 50° C., 55° C., 60° C., 65° C., 70° C., 75° C. or 80° C., etc.

In an embodiment, in step (1), the sealing and leaving to stand are performed for 12 hours to 24 hours, for example, 12 hours, 13 hours, 14 hours, 15 hours, 16 hours, 17 hours, 18 hours, 19 hours, 20 hours, 21 hours, 22 hours, 23 hours, or 24 hours, etc.

In an embodiment, in step (1), the conductive agent is at least one of glucose and fructose.

In an embodiment, in step (1), the pre-prepared particles have a particle size of 1 μm to 2 μm, for example, 1.0 μm, 1.1 μm, 1.2 μm, 1.3 μm, 1.4 μm, 1.5 μm, 1.6 μm, 1.7 μm, 1.8 μm, 1.9 μm or 2.0 μm, etc.

In an embodiment, in step (2), the slurry has a solid content of 50 g/L to 100 g/L, for example, 50 g/L, 55 g/L, 60 g/L, 65 g/L, 70 g/L, 75 g/L, 80 g/L, 85 g/L, 90 g/L, 95 g/L or 100 g/L, etc.

In an embodiment provided by the present disclosure, the solid content of the slurry is 50 g/L to 100 g/L, and if the solid content of the slurry is too high, the growth rate of particles in the system is slow, and the precursor within the particle size range of the present application cannot be obtained.

In an embodiment, in step (2), the stirring is performed at a speed of 350 rpm to 800 rpm, for example, 350 rpm, 400 rpm, 450 rpm, 500 rpm, 550 rpm, 600 rpm, 650 rpm, 700 rpm, 750 rpm or 800 rpm, etc.

In an embodiment, in step (2), the coprecipitation reaction is performed at a temperature of 30° C. to 60° C. for 5 hours to 150 hours, for example, 5 hours, 10 hours, 20 hours, 30 hours, 40 hours, 50 hours, 60 hours, 70 hours, 80 hours, 90 hours, 100 hours, 110 hours, 120 hours, 130 hours, 140 hours or 150 hours, etc., and the coprecipitation reaction is performed in a pH range of 6 to 8, for example, 6.0, 6.2, 6.4, 6.6, 6.8, 7.0, 7.2, 7.4, 7.6, 7.8 or 8.0, etc.

In an embodiment provided by the present disclosure, the temperature, duration and pH of the coprecipitation reaction process are controlled to be within the scopes of the present application so that the precursor with high degree of sphericity can be obtained, and compared with the related art in which the precursor having the particle size as described in the present application can be obtained only when the pH of the system is adjusted to more than 9, in the present application, the dosage of alkali in the system is greatly reduced, and meanwhile, manganese is prevented from being oxidized in the reaction process, so that the present application is suitable for large-scale production.

In an embodiment, in step (2), the metal salt is continuously introduced at a flow rate of 100 mL/h to 500 mL/h, for example, 100 mL/h, 150 mL/h, 200 mL/h, 250 mL/h, 300 mL/h, 350 mL/h, 400 mL/h, 450 mL/h or 500 mL/h, etc.; the precipitant is continuously introduced at a flow rate of 100 mL to 500 mL/h, for example, 100 mL/h, 150 mL/h, 200 mL/h, 250 mL/h, 300 mL/h, 350 mL/h, 400 mL/h, 450 mL/h or 500 mL/h, etc.; and the carbon dioxide is continuously introduced at a flow rate of 0.25 L/min to 0.6 L/min, for example, 0.25 L/min, 0.3 L/min, 0.35 L/min, 0.4 L/min, 0.45 L/min, 0.5 L/min, 0.55 L/min or 0.6 L/min, etc.

In an embodiment, in step (2), the reacted liquid has a solid content of 30 g/L to 500 g/L, for example, 30 g/L, 100 g/L, 150 g/L, 200 g/L, 250 g/L, 300 g/L, 350 g/L, 400 g/L, 450 g/L or 500 g/L, etc.

In an embodiment, in step (2), with stirring, a complexing agent is continuously introduced. The purpose of adding the complexing agent is to reduce the reaction speed of the system and inhibit the formation of new particles in the system. This process further includes continuously introducing the complexing agent with stirring.

In an embodiment, in step (2), the complexing agent is ammonia water or ammonium bicarbonate.

In an embodiment, the complexing agent is in a concentration of 10 g/L to 50 g/L, for example, 10 g/L, 15 g/L, 20 g/L, 25 g/L, 30 g/L, 35 g/L, 40 g/L, 45 g/L or 50 g/L, etc.

In an embodiment, in step (3), the reacted liquid and the aluminum salt are in a volume ratio of (10 to 20):1, for example, 10:1, 11:1, 12:1, 13:1, 14:1, 15:1, 16:1, 17:1, 18:1, 19:1 or 20:1, etc.

In an embodiment provided by the present disclosure, the volume ratio of the reacted liquid and the aluminum salt is (10 to 20):1, and with this mixing ratio, enough aluminum elements can be coated on the precursor, thereby improving the stability of the precursor.

In an embodiment, in step (3), the aluminum salt is at least one of aluminum chloride and aluminum sulfate.

In an embodiment, in step (3), the aluminum salt is in a concentration of 10 g/L to 50 g/L, for example, 10 g/L, 15 g/L, 20 g/L, 25 g/L, 30 g/L, 35 g/L, 40 g/L, 45 g/L or 50 g/L, etc.

In an embodiment, in step (3), the stirring for aging are performed at a speed of 200 rpm to 300 rpm, for example, 200 rpm, 210 rpm, 220 rpm, 230 rpm, 240 rpm, 250 rpm, 260 rpm, 270 rpm, 280 rpm, 290 rpm, 300 rpm, etc., and the aging and stirring are performed for 0.5 hour to 5 hours, for example, 0.5 hour, 1 hour, 1.5 hours, 2 hours, 2.5 hours, 3 hours, 3.5 hours, 4 hours, 4.5 hours or 5 hours, etc.

The present disclosure provides a method for preparing a cathode material in an embodiment. The method includes:

(a) mixing a precursor with a lithium salt and performing primary sintering, so as to obtain a primary sintered material; and (b) crushing the primary sintered material and performing secondary sintering, so as to obtain a cathode material.

In step (a), the precursor is the aluminum-coated precursor as described in an embodiment or an aluminum-coated precursor prepared by using the method as described in an embodiment.

According to the method for preparing a cathode material provided by an embodiment of the present disclosure, the above aluminum-coated precursor with controllable particle size, uniform particle size distribution, high degree of sphericity, smooth particle surface, high tap density, not easily breaking, excellent electrochemical performance, and excellent energy density is mixed with the lithium salt and then subjected to primary sintering and secondary sintering. In the above process, lithium ions enter the precursor material in the primary sintering and then combine to form a lithium salt cathode material, and then sintering process further sufficiently proceeds with secondary sintering, so as to prepare a cathode material with a high specific capacity, excellent cycle performance, and excellent electrochemical discharge performance.

In step (a) provided by an embodiment of the present disclosure, the above-mentioned precursor or a precursor prepared by using the above-mentioned method is mixed with the lithium salt and then subjected to primary sintering so that lithium ions in the lithium salt enter the precursor and combine to form a lithium salt cathode material which is, namely, the primary sintered material.

In step (b) provided by an embodiment of the present disclosure, the obtained primary sintered material is crushed and then subjected to secondary sintering so that the lithium salt which does not enter the precursor in the primary sintering further migrates into the inside of precursor, which enables the reaction to sufficiently proceed in the sintering process, so as to obtain the cathode material.

In an embodiment, in step (a), the precursor material and the lithium salt are in a molar ratio of 1:(1.02 to 1.08), for example, 1:1.02, 1:1.03, 1:1.04, 1:1.05, 1:1.06, 1:1.07 or 1:1.08, etc.

In an embodiment, in step (a), the primary sintering is performed at a temperature of 450° C. to 600° C. for 4 hours to 6 hours, for example, 4.0 hours, 4.2 hours, 4.4 hours, 4.6 hours, 4.8 hours, 5.0 hours, 5.2 hours, 5.4 hours, 5.6 hours, 5.8 hours or 6.0 hours, etc.

In an embodiment provided by the present disclosure, the primary sintering is performed at a temperature of 450° C. to 600° C., and if the temperature is too low, part of lithium ions cannot enter the precursor and no lithium salt cathode material can be formed while if the temperature is too high, energy is wasted. Therefore, when the sintering is performed in this temperature range, not only lithium ions can migrate into the inside of precursor and generate the lithium salt cathode material, but also the energy waste can be avoided.

In an embodiment, in step (b), the secondary sintering is performed at a temperature of 700° C. to 850° C. for 15 hours to 25 hours, for example, 15 hours, 16 hours, 17 hours, 18 hours, 19 hours, 20 hours, 21 hours, 22 hours, 23 hours, 24 hours or 25 hours, etc.

In an embodiment provided by the present disclosure, the particle size that the primary sintered material is to be crushed into may be selected by those skilled in the art according to actual requirements, and details will not be repeated herein.

The present disclosure provides a cathode material in an embodiment. The cathode material is prepared by using the method described in claim 6 or 7.

In an embodiment, the cathode material has a chemical formula of $Li(Li_aNi_mCo_nMn_{(1-a-b-m-n)}Al_b)O_2$, where a is 0.05 to 0.35, b is 0.005 to 0.01, m is 0.01 to 0.25, and n is 0.01 to 0.25, for example, a is 0.05, 0.1, 0.15, 0.2, 0.25, 0.3 or 0.35, etc., b is 0.005, 0.006, 0.007, 0.008, 0.009 or 0.01, etc., m is 0.01, 0.05, 0.1, 0.15, 0.2 or 0.25, etc., and n is 0.01, 0.05, 0.1, 0.15, 0.2 or 0.25, etc.

In an embodiment provided by the present disclosure, the cathode material has high specific capacity, excellent cycle performance, and excellent electrochemical discharge performance.

The present disclosure provides a lithium battery in an embodiment. The lithium battery includes the cathode material as described in an embodiment.

In an embodiment provided by the present disclosure, the lithium battery has a long cycle life while having high specific energy.

The present disclosure provides a vehicle in an embodiment. The vehicle includes the lithium battery as described in an embodiment.

In an embodiment provided by the present disclosure, the vehicle loaded with the lithium battery having high specific energy and long cycle life has excellent endurance, thereby satisfying the use requirements of consumers.

BRIEF DESCRIPTION OF DRAWINGS

The drawings are used to provide a further understanding of the technical solutions of the present disclosure, constitute a part of the description, explain the solutions of the present disclosure in conjunction with the embodiments of the present application, and do not limit the technical solutions of the present disclosure.

FIG. 1 is a flowchart of a method for preparing an aluminum-coated precursor according to an embodiment of the present disclosure;

FIG. 2 is a flowchart of a method for preparing a cathode material according to an embodiment of the present disclosure;

DETAILED DESCRIPTION

Figure 3:
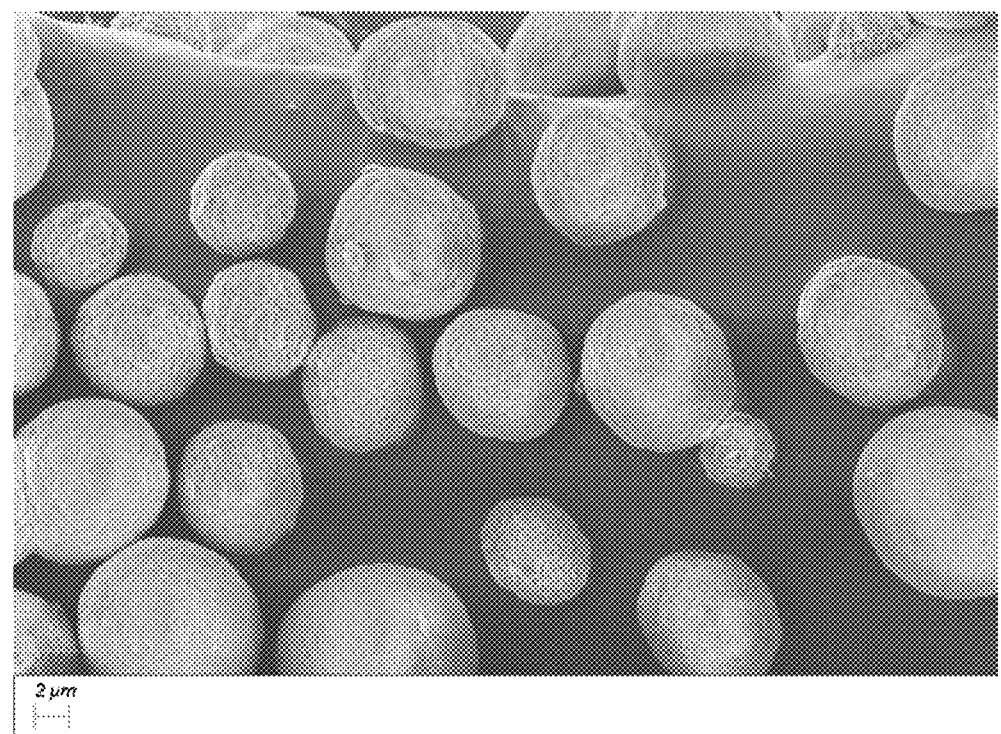
FIG. 3 is a scanning electron microscope image of a prepared aluminum-coated precursor according to an embodiment of the present disclosure.

Technical solutions of the present disclosure are further described below through specific embodiments in conjunction with the drawings.

In an embodiment, the present disclosure provides an aluminum-coated precursor. The precursor has a chemical formula of $xMCO_3(1-x)\cdot Al(OH)_3$, where M is at least one of nickel, cobalt and manganese, and x is 0.995 to 0.999. The aluminum-coated precursor has the advantages of controllable particle size, uniform particle size distribution, high degree of sphericity, smooth particle surface, high tap density, not easily breaking, excellent electrochemical performance, and excellent energy density, and meanwhile, the cathode material prepared by using the precursor has a high specific capacity, excellent cycle performance, and excellent electrochemical discharge performance. The precursor having such a composition has a high specific discharge capacity and stability. The precursor has a particle size of 6 μm to 15 μm and a tap density of not lower than 1.8 $g/cm^3$.

In an embodiment, the present disclosure provides a method for preparing the aluminum-coated precursor. As shown in FIG. 1, the method includes steps S100, S200, S300, and S400.

In S100, carbon dioxide is continuously introduced in the presence of a conductive agent, a metal salt is mixed with a precipitant for a precipitation reaction and then sealed and left to stand, so as to obtain pre-prepared particles. The concentration of the metal salt is 80 g/L to 400 g/L. The precipitant is at least one selected from the group consisting of sodium carbonate, ammonium bicarbonate, sodium hydroxide, and sodium bicarbonate, where the concentration of sodium carbonate is 50 g/L to 200 g/L, the concentration of ammonium bicarbonate is 50 g/L to 200 g/L, the concentration of sodium hydroxide is 50 g/L to 200 g/L, and the concentration of sodium bicarbonate is 50 g/L to 200 g/L. The molar ratio of the metal salt to the precipitant is 1:(2 to 3.5). The amount of the conductive agent is 10 g to 50 g, based on a total of 1 L of the metal salt and the precipitant. In this process, carbon dioxide is continuously introduced at a flow rate of 0.1 L/min to 0.5 L/min. The precipitation reaction is performed at a temperature of 30° C. to 80° C. The operation of sealing and leaving to stand is performed for 12 hours to 24 hours. The particle size of the obtained pre-prepared particles is 1 μm to 2 μm.

In S200, the pre-prepared particles are mixed with water to obtain a slurry, and with stirring, the metal salt, the precipitant and carbon dioxide are continuously introduced to perform a coprecipitation reaction, so as to obtain a reacted liquid. The solid content of the slurry obtained by mixing pre-prepared particles and water is 50 g/L to 100 g/L. The stirring is performed at a speed of 350 rpm to 800 rpm. The coprecipitation reaction is performed at a temperature of 30° C. to 60° C. for 5 hours to 150 hours in a pH range of 6 to 8. The metal salt is continuously introduced at a flow rate of 100 mL/h to 500 mL/h, the precipitant is continuously introduced at a flow rate of 100 mL to 500 mL/h, and the carbon dioxide is continuously introduced at a flow rate of 0.25 L/min to 0.6 L/min. The solid content of the reacted liquid is controlled to be 30 g/L to 500 g/L.

In S300, the obtained reacted liquid is mixed with an aluminum salt for a reaction and then is aged and stirred, where aluminum elements in the aluminum salt react with the precipitant to precipitate on the surface of the precursor, so as to obtain an aged material. The aluminum salt is at least one of aluminum chloride and aluminum sulfate. The concentration of the aluminum salt is 10 g/L to 50 g/L. The weight ratio of the reacted liquid to the aluminum salt is (10 to 20):1. The stirring for aging is performed at a speed of 200 rpm to 300 rpm for 0.5 hour to 5 hours.

In S400, iron removal, solid-liquid separation, washing, and drying are successively performed on the aged material.

In an embodiment, the present disclosure provides a method for preparing a cathode material. As shown in FIG. 2, the method includes steps Sa and Sb.

In Sa, the above-mentioned precursor or a precursor prepared by using the above-mentioned method is mixed with a lithium salt and then subjected to primary sintering, so that lithium ions in the lithium salt enter the precursor and combine to form a lithium salt cathode material which is, namely, the primary sintered material. The lithium salt is selected from at least one of lithium hydroxide and lithium carbonate, the molar ratio of the precursor material to the lithium salt is 1:(1.02 to 1.08), and the primary sintering is performed at a temperature of 450° C. to 600° C. for 4 hours to 6 hours.

In Sb, the primary sintered material obtained in step Sa is crushed and then subjected to secondary sintering so that the lithium salt which does not enter the precursor in the primary sintering further migrates into the inside of precursor, which enables the reaction to sufficiently proceed in the sintering process, so as to obtain a cathode material. The secondary sintering is performed at 700° C. to 850° C. for 15 hours to 25 hours.

In an embodiment, the present disclosure provides a cathode material. The cathode material is prepared by using the method as described in the preceding embodiment.

In an embodiment, the present disclosure provides a lithium battery. The lithium battery includes the cathode material as described in the preceding embodiment.

In an embodiment, the present disclosure provides a vehicle. The vehicle includes the lithium battery as described in the preceding embodiment.

Example 1

The aluminum-coated precursor was prepared by using the following method.

(1) Nickel sulfate, cobalt sulfate and manganese sulfate were mixed in a nickel-cobalt-manganese molar ratio of 0.2:0.18:0.6 to obtain a mixed metal salt, where the concentrations of nickel sulfate, cobalt sulfate and manganese sulfate in the mixed metal salt were all 400 g/L. Then in the presence of glucose as the conductive agent, carbon dioxide was continuously introduced at a flow rate of 0.1 L/min, the mixed metal salt and a sodium hydroxide solution with a concentration of 200 g/L were quickly mixed (the mixing was completed within 10 seconds, where the molar ratio of the mixed metal salt to sodium hydroxide was 1:2.0, and the amount of the conductive agent glucose was 20 g based on a total of 1 L of the mixed metal salt and sodium hydroxide), and the mixture was sealed and left to stand at 30° C. for 12 hours, so as to obtain pre-prepared particles with a particle size of 1.2 μm.

(2) The pre-prepared particles were mixed with water to obtain a slurry (with the solid content of 200 g/L), and then the coprecipitation reaction was performed with stirring (at a speed of 400 rpm). Meanwhile, the mixed metal salt (at a flow rate of 200 mL/h), sodium bicarbonate (in a concentration of 50 g/L to 200 g/L and at a flow rate of 150 mL/h to 250 mL/h) and carbon dioxide (at a flow rate of 0.25 mL/min) were continuously introduced, and the pH of the system was controlled to be 7.5. The reaction was performed for 60 hours, so as to obtain a reacted material with a solid content of 500 g/L.

(3) The reacted liquid was mixed with aluminum chloride and then aged and stirred, so as to obtain an aged material, where the stirring was performed at a speed of 300 rpm and the aging was performed for 2 hours.

(4) The obtained aged material was successively subjected to iron removal, solid-liquid separation, washing and drying, so as to obtain an aluminum-coated precursor with a particle size of 8 μm, where the precursor had a chemical formula of $(Mn_{0.6}Ni_{0.2}Co_{0.18})CO_3 \cdot 0.02Al(OH)_3$ and a tap density of 1.8 g/cm³.

The cathode material was prepared by using the following method.

In Sa, the aluminum-coated precursor obtained in step (4) and lithium hydroxide were mixed in a molar ratio of 1:1.06 and then subjected to primary sintering at 500° C. in an air atmosphere for 6 hours, so as to obtain a primary sintered material.

In Sb, the obtained primary sintered material was crushed and then subjected to secondary sintering at 700° C. for 18 hours, so as to obtain a cathode material that had a chemical formula of $Li(Li_{0.2}Ni_{0.16}Co_{0.15}Mn_{0.48}Al_{0.014})O_2$ and a compaction density of 3.2 g/cm³.

Figure 4:
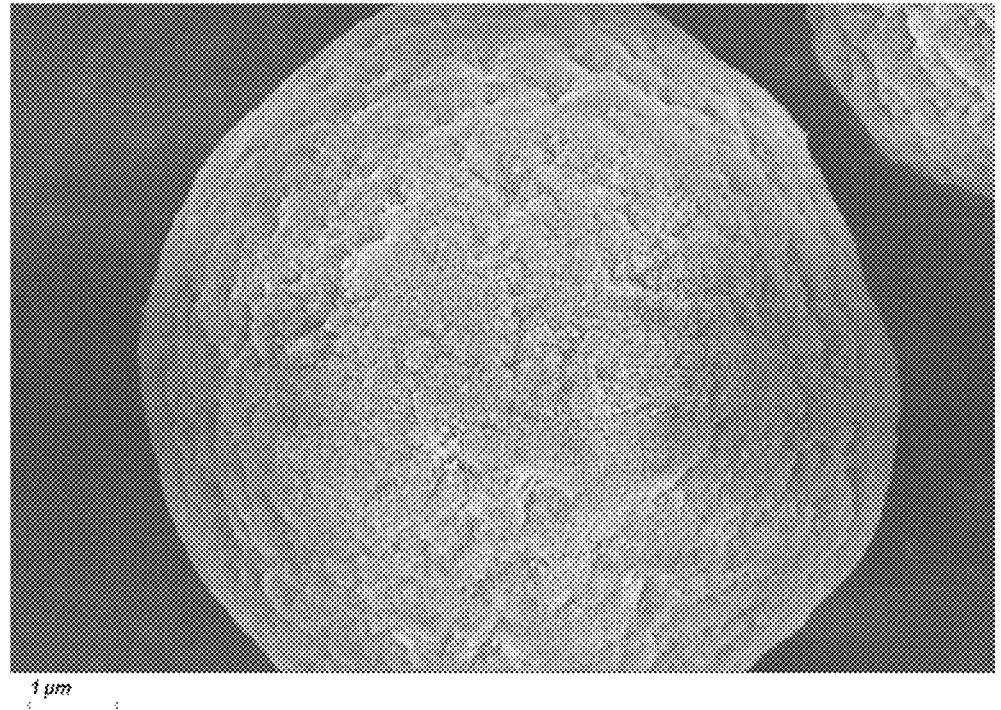
FIG. 4 is a scanning electron microscope image of a prepared aluminum-coated precursor according to an embodiment of the present disclosure.
Figure 5:
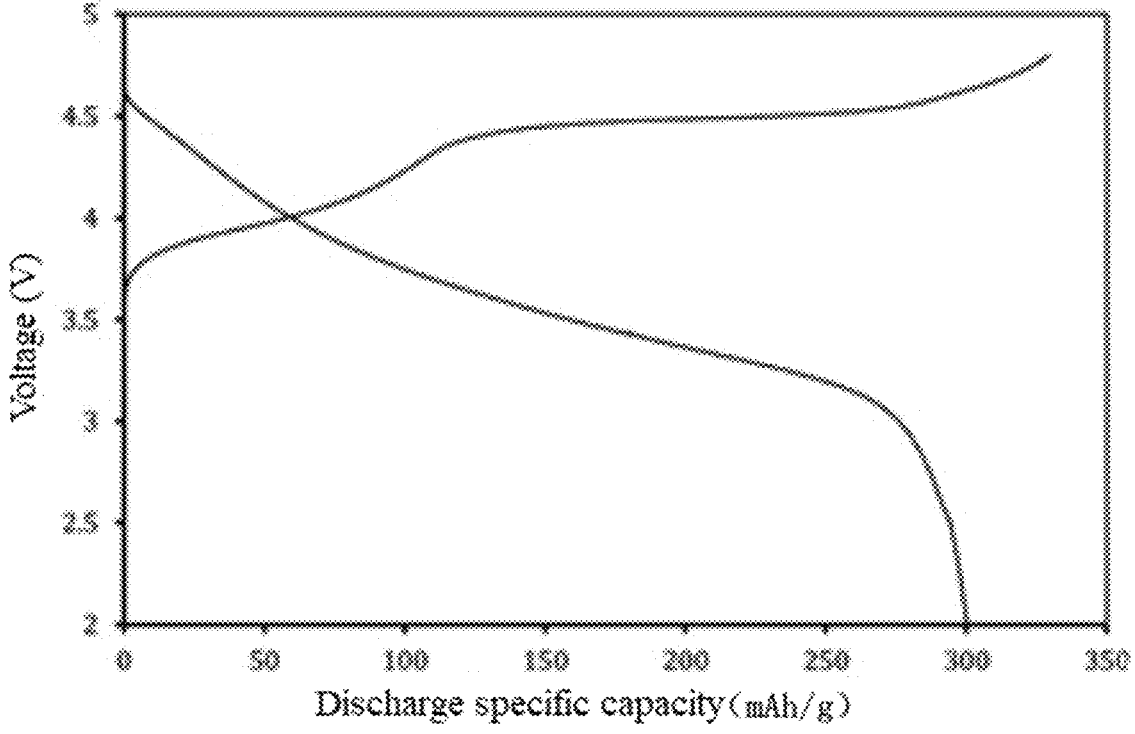
FIG. 5 is a first charge-discharge curve at 0.1 C of a button cell made of a prepared cathode material according to an embodiment of the present disclosure.

Conclusion: FIG. 3 and FIG. 4 are scanning electron microscope images of the precursor material. As can be seen, the precursor material prepared by using the above-mentioned method had a spherical structure, uniform particle size distribution and smooth surface, and it is further found from the detection of the particle size distribution by a laser particle size analyzer that the precursor had a uniform particle size distribution. Meanwhile, the cathode material was mixed with conductive agent carbon black (SP) and polyvinylidene fluoride (PVDF) and then stirred with N-methylpyrrolidone (NMP) as a solvent for several hours for pulping to prepare a lithium-ion half cell. The charge-discharge test was performed by using a LAND cell tester at 4.8 V, and it is found that the discharge capacity of per gram of the product at 0.1 C was 305 mAh (FIG. 5 is a charge-discharge curve of the lithium-ion half cell at 0.1 C), the discharge capacity at 1.0 C was 230 mAh to 240 mAh, and the capacity retention rate was 92% after 50 cycles.

Example 2

The aluminum-coated precursor was prepared by using the following method.

(1) Nickel chloride, cobalt chloride and manganese chloride were mixed in a nickel-cobalt-manganese molar ratio of 0.2:0.09:0.7 to obtain a mixed metal salt, where the concentrations of nickel chloride, cobalt chloride and manganese chloride in the mixed metal salt were all 300 g/L. Then in the presence of fructose as the conductive agent, carbon dioxide was continuously introduced at a flow rate of 0.5 L/min, the mixed metal salt and a sodium hydroxide solution with a concentration of 50 g/L were quickly mixed (the mixing was completed within 10 seconds, where the molar ratio of the mixed metal salt to sodium hydroxide was 1:3.5, and the amount of the conductive agent fructose was 30 g based on the total of 1 L of the mixed metal salt and sodium hydroxide), and the mixture was sealed and left to stand at 80° C. for 18 hours, so as to obtain pre-prepared particles with a particle size of 1.5 μm.

(2) The pre-prepared particles were mixed with water to obtain a slurry (with the solid content of 100 g/L), and then the coprecipitation reaction was performed with stirring (at a speed of 500 rpm). Meanwhile, the mixed metal salt (at a flow rate of 300 mL/h), sodium carbonate (in a concentration of 50 g/L to 200 g/L and at a flow rate of 250 mL/h to 350 mL/h) and carbon dioxide (at a flow rate of 0.4 mL/min) were continuously introduced, and the pH of the system was controlled to be 8. The reaction was performed for 50 hours, so as to obtain a reacted material with a solid content of 800 g/L.

(3) The reacted liquid was mixed with aluminum sulfate and then aged and stirred, so as to obtain an aged material, where the stirring was performed at a speed of 300 rpm and the aging was performed for 2 hours.

(4) The obtained aged material was successively subjected to iron removal, solid-liquid separation, washing and drying, so as to obtain an aluminum-coated precursor with a particle size of 10 μm, where the precursor had a chemical formula of $(Mn_{0.7}Ni_{0.2}Co_{0.09})CO_3 \cdot 0.01Al(OH)_3$ and a tap density of 1.8 g/cm³.

The cathode material was prepared in the following method.

In Sa, the aluminum-coated precursor obtained in step (4) and lithium carbonate were mixed in a molar ratio of 1:1.06 and then subjected to primary sintering at 500° C. in an air atmosphere for 5 hours, so as to obtain a primary sintered material.

In Sb, the obtained primary sintered material was crushed and then subjected to secondary sintering at 750° C. for 20 hours, so as to obtain a cathode material that had a chemical formula of $Li(Li_{0.2}Ni_{0.16}Co_{0.07}Mn_{0.56}Al_{0.008})O_2$ and a compaction density of 3.1 g/cm$^3$.

Conclusion: as can be seen from the scanning electron microscope image of the precursor material, the precursor material prepared by using the above-mentioned method had a spherical structure, uniform particle size distribution, and smooth surface, and it is further found from the detection of the particle size distribution by a laser particle size analyzer that the precursor had a uniform particle size distribution. Meanwhile, the cathode material was mixed with conductive agent carbon black (SP) and polyvinylidene fluoride (PVDF) and then stirred with N-methylpyrrolidone (NMP) as a solvent for several hours for pulping to prepare a lithium-ion half cell. The charge-discharge test was performed by using a LAND cell tester at 4.8 V, and it is found that the discharge capacity of per gram of the product at 0.1 C was 295 mAh to 305 mAh, the discharge capacity at 1.0 C was 230 mAh to 235 mAh, and the capacity retention rate was 88% after 50 cycles.

Example 3

The aluminum-coated precursor was prepared by using the following method.

(1) Nickel nitrate, cobalt nitrate and manganese nitrate were mixed in a nickel-cobalt-manganese molar ratio of 0.2:0.19:0.6 to obtain a mixed metal salt, where the concentrations of nickel nitrate, cobalt nitrate and manganese nitrate in the mixed metal salt were all 200 g/L. Then in the presence of glucose as the conductive agent, carbon dioxide was continuously introduced at a flow rate of 0.3 L/min, the mixed metal salt and a sodium carbonate solution with a concentration of 100 g/L were quickly mixed (the mixing was completed within 10 seconds, where the molar ratio of the mixed metal salt to sodium carbonate was 1:2.8, and the amount of the conductive agent glucose was 25 g based on the total of 1 L of the mixed metal salt and sodium hydroxide), and the mixture was sealed and left to stand at 50° C. for 20 hours, so as to obtain pre-prepared particles with a particle size of 1.8 m.

(2) The pre-prepared particles were mixed with water to obtain a slurry (with the solid content of 60 g/L), and then the coprecipitation reaction was performed with stirring (at a speed of 400 rpm). Meanwhile, the mixed metal salt (at a flow rate of 250 mL/h), sodium bicarbonate (in a concentration of 50 g/L to 200 g/L and at a flow rate of 200 mL/h to 300 mL/h), carbon dioxide (at a flow rate of 0.6 mL/min) and ammonia water as the complexing agent (in a concentration of 30 g/L) were continuously introduced, and the pH of the system was controlled to be 6.5. The reaction was performed for 50 hours, so as to obtain a reacted material with a solid content of 500 g/L.

(3) The reacted liquid was mixed with aluminum chloride and then aged and stirred, so as to obtain an aged material, where the stirring was performed at a speed of 300 rpm and the aging was performed for 2 hours.

(4) The obtained aged material was successively subjected to iron removal, solid-liquid separation, washing and drying, so as to obtain an aluminum-coated precursor with a particle size of 15 μm, where the precursor had a chemical formula of $(Mn_{0.6}Ni_{0.2}Co_{0.19})CO_3 \cdot 0.01Al(OH)_3$ and a tap density of 1.9 g/cm$^3$.

The cathode material was prepared in the following method.

In Sa, the aluminum-coated precursor obtained in step (4) and lithium hydroxide were mixed in a molar ratio of 1:1.02 and then subjected to primary sintering at 550° C. in an air atmosphere for 5 hours, so as to obtain a primary sintered material.

In Sb, the obtained primary sintered material was crushed and then subjected to secondary sintering at 800° C. for 20 hours, so as to obtain a cathode material which had a chemical formula of $Li(Li_{0.2}Ni_{0.16}Co_{0.15}Mn_{0.48}Al_{0.008})O_2$ and a compaction density of 3.2 g/cm$^3$.

Conclusion: as can be seen from the scanning electron microscope image of the precursor material, the precursor material prepared by using the above-mentioned method had a spherical structure, uniform particle size distribution, and smooth surface, and it is further found from the detection of the particle size distribution by a laser particle size analyzer that the precursor had a uniform particle size distribution. Meanwhile, the cathode material was mixed with conductive agent carbon black (SP) and polyvinylidene fluoride (PVDF) and then stirred with N-methylpyrrolidone (NMP) as a solvent for several hours for pulping to prepare a lithium-ion half cell. The charge-discharge test was performed by using a LAND cell tester at 4.8 V, and it is found that the discharge capacity of per gram of the product at 0.1 C was 255 mAh to 260 mAh, the discharge capacity at 1.0 C was 205 mAh to 208 mAh, and the capacity retention rate was 84% after 50 cycles.

What is claimed is:

1. A method for preparing an aluminum-coated precursor, having a chemical formula of $xMCO_3(1-x) \cdot Al(OH)_3$, wherein M is at least one of nickel, cobalt and manganese, and x is 0.995 to 0.999, comprising:

(1) continuously introducing carbon dioxide in the presence of a conductive agent, mixing a metal salt with a precipitant for a precipitation reaction, and then sealing same and leaving to stand, so as to obtain pre-prepared particles;

(2) mixing the pre-prepared particles with water to obtain a slurry, and with stirring, continuously introducing the metal salt, the precipitant and the carbon dioxide for a coprecipitation reaction, so as to obtain a reacted liquid;

(3) mixing the reacted liquid with an aluminum salt for a reaction, and aging and stirring same, so as to obtain an aged material; and (4) successively performing iron removal, solid-liquid separation, washing, and drying on the aged material, so as to obtain an aluminum-coated precursor.

2. The method according to claim 1, wherein, in step (1), the metal salt comprises at least one of a soluble nickel salt, a soluble manganese salt and a soluble cobalt salt, and the metal salt is in a concentration of 899 g/L to 400 g/L.

3. The method according to claim 2, wherein, in step (1), the soluble nickel salt is at least one selected from the group consisting of nickel chloride, nickel nitrate, and nickel sulfate, the soluble cobalt salt is at least one selected from the group consisting of cobalt chloride, cobalt nitrate, and cobalt sulfate, and the soluble manganese salt is at least one selected from the group consisting of manganese chloride, manganese nitrate, and manganese sulfate.

4. The method according to claim 1, wherein, in step (1), the carbon dioxide is at a flow rate of 0.1 L/min to 0.5 L/min.

5. The method according to claim 1, wherein, in step (1), the metal salt and the precipitant are in a molar ratio of 1:(2 to 3.5).

6. The method according to claim 1, wherein, in step (1), the conductive agent is used in an amount of 10 g to 50 g, based on a total of 1 L of the metal salt and the precipitant.

7. The method according to claim 1, wherein, in step (1), the precipitant is at least one selected from the group consisting of sodium carbonate, ammonium bicarbonate, sodium hydroxide, and sodium bicarbonate:

optionally, the sodium carbonate is in a concentration of 50 g/L to 200 g/L;

optionally, the ammonium bicarbonate is in a concentration of 50 g/L to 200 g/L;

optionally, the sodium hydroxide is in a concentration of 50 g/L to 200 g/L; and optionally, the sodium bicarbonate is in a concentration of 50 g/L to 200 g/L.

8. The method according to claim 1, wherein, in step (1), the conductive agent is at least one of glucose and fructose;

wherein, in step (1), the pre-prepared particles have a particle size of 1 μm to 2 μm.

9. The method according to claim 1, wherein, in step (2), the slurry has a solid content of 50 g/L to 100 g/L.

10. The method according to claim 1, wherein, in step (2), the metal salt is continuously introduced at a flow rate of 100 mL/h to 500 mL/h, the precipitant is continuously introduced at a flow rate of 100 mL to 500 mL/h, and the carbon dioxide is continuously introduced at a flow rate of 0.25 L/min to 0.6 L/min, and the reacted liquid has a solid content of 30 g/L to 500 g/L.

11. The method according to claim 1, wherein, in step (2), with stirring, a complexing agent is continuously introduced, the complexing agent is ammonia water or ammonium bicarbonate, and the complexing agent is ammonia water or ammonium bicarbonate.

12. The method according to claim 1, wherein, in step (3), the reacted liquid and the aluminum salt are in a volume ratio of (10 to 20):1, the aluminum salt is at least one of aluminum chloride and aluminum sulfate, and the aluminum salt is in a concentration of 10 g/L to 50 g/L.

\* \* \* \* \*